United States Patent
Yamada (10) Patent No.: US 10,452,903 B2
(45) Date of Patent: Oct. 22, 2019

(54) INFORMATION EXTRACTION DEVICE, IMAGE FORMING APPARATUS INCLUDING INFORMATION EXTRACTION DEVICE AND METHOD OF CONTROLLING INFORMATION EXTRACTION DEVICE

(71) Applicant: KYOCERA Document Solutions Inc., Osaka (JP)

(72) Inventor: Atsushi Yamada, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 220 days.

(21) Appl. No.: 15/650,162

(22) Filed: Jul. 14, 2017

(65) Prior Publication Data
US 2018/0032809 A1   Feb. 1, 2018

(30) Foreign Application Priority Data

Jul. 28, 2016   (JP) ................. 2016-148095

(51) Int. Cl.
*G06K 9/00*   (2006.01)
*G06T 7/73*   (2017.01)
(Continued)

(52) U.S. Cl.
CPC ..... *G06K 9/00463* (2013.01); *G06K 9/00449* (2013.01); *G06K 9/2063* (2013.01);
(Continued)

(58) Field of Classification Search
CPC .......... G06K 9/00449; G06K 9/00463; G06K 9/2063; G06T 7/11; G06T 7/74; G06T 7/90
See application file for complete search history.

(56) References Cited

U.S. PATENT DOCUMENTS 6,009,194 A    12/1999  Hirayama ................. 382/173
2006/0122956 A1*  6/2006  Shimogori ............ G06F 16/93
(Continued)

FOREIGN PATENT DOCUMENTS

JP        10-63744 A      3/1998
JP     2004-246597 A      9/2004
(Continued)

OTHER PUBLICATIONS

Japanese Office Action dated May 28, 2019, issued by the Japanese Patent Office in corresponding application JP 2016-148095.

*Primary Examiner* — Edward Park
(74) *Attorney, Agent, or Firm* — Stein IP, LLC (57) ABSTRACT

An information extraction device includes a storage unit, an image reading device and a control unit. Based on the color of a colored region in a reference original document (reference image data), the control unit classifies the colored region into a first colored region and a second colored region. The storage unit stores feature image data including the first colored region and position data indicating a distance and a direction from the feature image data to the second colored region. The control unit determines an extraction region based on the position of a region matching with the feature image data in comparative image data and the position data. The control unit stores, in the storage unit, extraction information extracted from the extraction region.

10 Claims, 4 Drawing Sheets

(51) Int. Cl.
*G06T 7/11* (2017.01)
*G06T 7/90* (2017.01)
*G06K 9/20* (2006.01)

(52) U.S. Cl.
CPC .................. *G06T 7/11* (2017.01); *G06T 7/74* (2017.01); *G06T 7/90* (2017.01)

(56) References Cited

U.S. PATENT DOCUMENTS

| | | | |
|---|---|---|---|
| 2013/0182002 A1* | 7/2013 | Macciola | H04N 1/387 345/589 |
| 2013/0250322 A1* | 9/2013 | Kawabata | H04N 1/60 358/1.9 |

FOREIGN PATENT DOCUMENTS

| | | |
|---|---|---|
| JP | 2008-276677 A | 11/2008 |
| JP | 2012-221183 A | 11/2012 |
| JP | 2014-170452 A | 9/2014 |

\* cited by examiner

| Setting Of Information Extraction Mode | | | | | | | |
|---|---|---|---|---|---|---|---|
| 1. Set Colors | | | | | | | |
| Feature Portion | Peach | Red | Yellow | Blue | Green | Orange | Purple |
| Information Portion | Peach | Red | Yellow | Blue | Green | Orange | Purple |

2. Data Type Of Extracted Information
☑ Image Data   ☑ Text Data

3. Destination (Pass) To Which Extracted Information Is Output

OK   Cancel

FIG.5

INFORMATION EXTRACTION DEVICE, IMAGE FORMING APPARATUS INCLUDING INFORMATION EXTRACTION DEVICE AND METHOD OF CONTROLLING INFORMATION EXTRACTION DEVICE

This application is based upon and claims the benefit of priority from the corresponding Japanese Patent Application No. 2016-148095 filed on Jul. 28, 2016, the entire contents of which are incorporated herein by reference.

BACKGROUND

The present disclosure relates to a device which extracts information from image data and a method of controlling such a device.

The format (form) of a document may be registered. Then, information may be extracted from image data which includes the registered format. For example, information is extracted from image data which is obtained by scanning a document (original document). Before the extraction of the information, a determination as to whether or not the image data obtained by the scanning agrees with the registered format may be performed. An example of a technology on the extraction of information based on a format as described below is known.

Specifically, a system is known in which the layout of a document where a plurality of cells are arranged according to a certain rule is analyzed with reference to format data that is stored, in which format data specifying the types of information present on the individual cells and an adjacent relationship between the cells is stored, in which the image data of the document is extracted, in which the extraction of a plurality of cells from the image data and the adjacent relationship between the cells are determined, in which the adjacent relationship between the cells in the document is compared with the adjacent relationship between the cells specified by the format data, in which the cells specified by the corresponding format data are identified from among the cells in the document such that the arrangement of information in the document is identified and in which the information contained in the document is recognized according to the arrangement of the identified information.

In a document such as a sheet form, information is written. For example, a name, an address and a telephone number are written. It is convenient that it is possible to automatically extract desired information from the image data of a document and to convert it into data. It is not necessary for an inputting person to manually input the information with a keyboard while seeing the document. In a document, an answer column may be provided. The answer column is an entry column for the selection of an answerer. For example, the answer column includes a check box or a circled symbol. An entry person checks the corresponding box or circles the corresponding symbol. When information selected in the answer column (what type of symbol is entered and in which position the symbol is entered) can be automatically extracted, it is not necessary to check the selected answer for each of sheets in a document.

SUMMARY

An information extraction device according to one aspect of the present disclosure includes a storage unit, an image reading device and a control unit. The storage unit stores data. The image reading device reads an original document so as to generate image data on the original document. The control unit recognizes a colored region that is colored in reference image data obtained by reading a reference original document with the image reading device. The control unit classifies, based on the color of the colored region, the colored region into a first colored region and a second colored region. The control unit stores, from the reference image data, in the storage unit, feature image data that includes the first colored region. The control unit stores, in the storage unit, position data indicating a distance and a direction from the feature image data to the second colored region. The control unit determines whether or not a region matching with the feature image data is included within comparative image data obtained by reading a comparative original document with the image reading device after the reading of the reference original document. The control unit determines, when the region matching therewith is determined to be included therewithin, an extraction region based on the position of the region matching with the feature image data within the comparative image data and the distance and the direction based on the position data. The control unit extracts information included in the extraction region as extraction information. The control unit stores the extraction information in the storage unit. The control unit neither determines, when the region matching therewith is determined not to be included therewithin, the extraction region nor extracts the extraction information.

A method of controlling an information extraction device according to another aspect of the present invention includes: storing data; reading an original document so as to generate image data on the original document; recognizing a colored region that is colored in reference image data obtained by reading a reference original document; classifying, based on the color of the colored region, the colored region into a first colored region and a second colored region; storing, from the reference image data, feature image data that includes the first colored region; storing position data indicating a distance and a direction from the feature image data to the second colored region; determining whether or not a region matching with the feature image data is included within comparative image data obtained by reading a comparative original document after the reading of the reference original document; determining, when the region matching therewith is determined to be included therewithin, an extraction region based on the position of the region matching with the feature image data within the comparative image data and the distance and the direction based on the position data; extracting information included in the extraction region as extraction information; storing the extraction information; and neither determining, when the region matching therewith is determined not to be included therewithin, the extraction region nor extracting the extraction information.

Further features and advantages of the present disclosure will become apparent from the description of embodiments given below.

DETAILED DESCRIPTION

In the present disclosure, it is possible to easily set a region for extracting information without use of a PC. An information extraction device 1 according to the present disclosure will be described below with reference to FIGS. 1 to 5. An image forming apparatus which includes the information extraction device 1 will be described. The image forming apparatus will be described using a multifunctional machine 100 as an example. However, individual elements such as configurations and arrangements described in the present embodiment do not limit the scope of the disclosure and are simply examples of the description.

(Outline of Multifunctional Machine 100)

Figure 1:
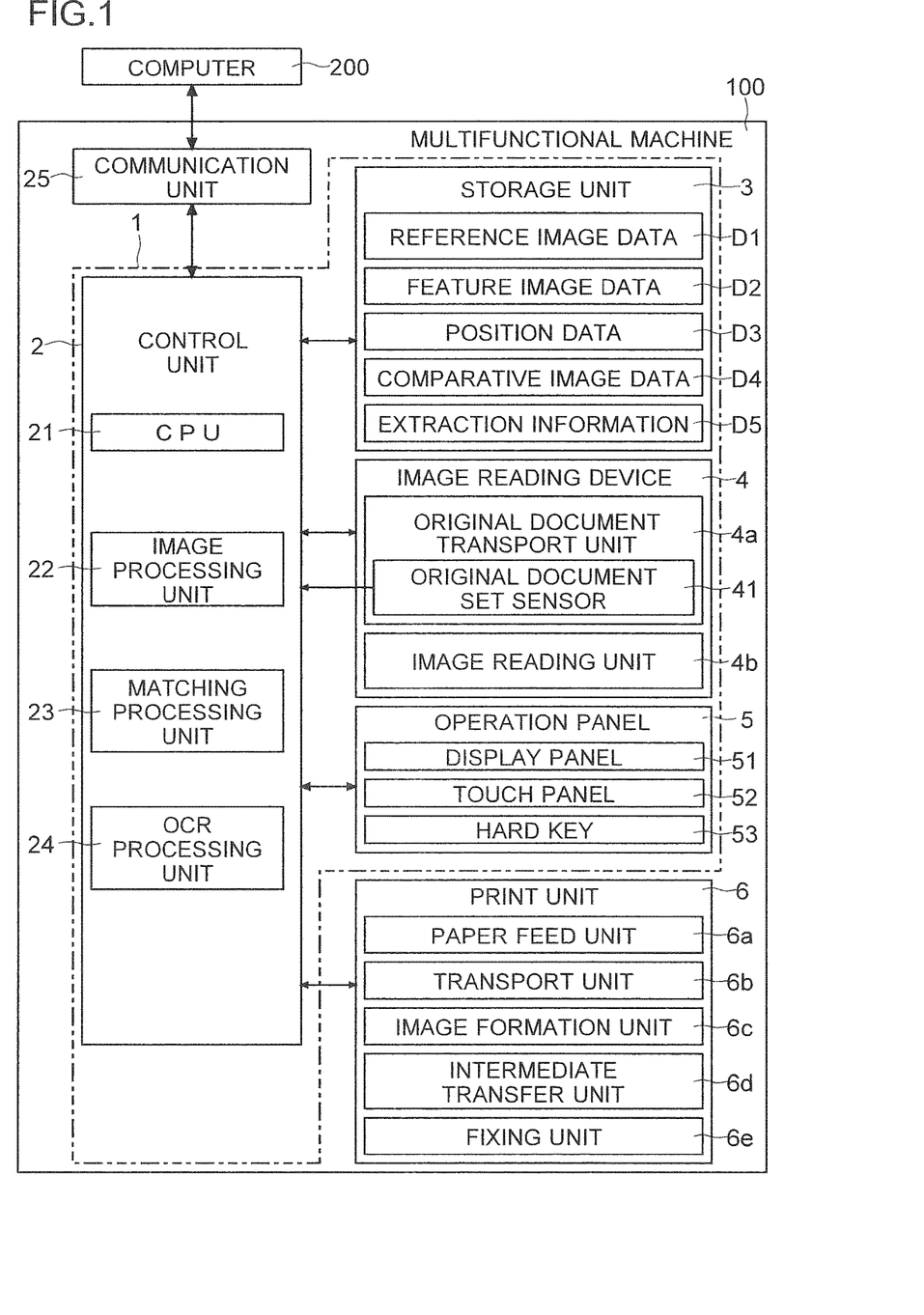
FIG. 1 is a diagram showing an example of a multifunctional machine according to an embodiment.

The multifunctional machine 100 according to the embodiment will first be described with reference to FIG. 1. The multifunctional machine 100 includes a control unit 2 and a storage unit 3. The control unit 2 supervises the operation of the entire machine. The control unit 2 controls the individual portions of the multifunctional machine 100. The control unit 2 includes a CPU 21, an image processing unit 22, a matching processing unit 23 and an OCR processing unit 24. The CPU 21 performs computations on the control. The image processing unit 22 performs image processing necessary for a job on image data.

The matching processing unit 23 compares feature image data D2 and comparative image data D4. The matching processing unit 23 determines whether or not a region (region where the degree of similarity is equal to or more than a threshold value) which matches with the feature image data D2 is included in the comparative image data D4. The OCR processing unit 24 performs OCR processing on the image data. The OCR processing unit 24 extracts text data from the image data. The storage unit 3 includes storage devices such as a ROM, a RAM and a HDD. The storage unit 3 stores control programs and various types of data.

The control unit 2 is connected to an image reading device 4 such that the control unit 2 can communicate with the image reading device 4. The image reading device 4 includes an original document transport unit 4a and an image reading unit 4b. The original document transport unit 4a transports, to a reading position, an original document which is set. The image reading unit 4b is a scanner unit which includes a light source and an image sensor. The image reading unit 4b reads the original document which is transported by the original document transport unit 4a. The image reading unit 4b also reads an original document which is set on an original document stage (contact glass). Then, the image reading unit 4b generates the image data. The image reading unit 4b can perform the reading based on color. The control unit 2 controls the operations of the original document transport unit 4a and the image reading unit 4b.

An operation panel 5 includes a display panel 51 (which corresponds to a message output portion), a touch panel 52 and hard keys 53. The control unit 2 controls the display of the display panel 51. The control unit 2 displays a setting screen on the display panel 51. The control unit 2 displays operation images on the display panel 51. The operation images are, for example, soft keys. Based on the output of the touch panel 52, the control unit 2 recognizes the operation image which is touched. The control unit 2 recognizes the hard key 53 which is operated. The control unit 2 makes the display panel 51 switch to a screen corresponding to the operation. The control unit 2 recognizes the details of a setting operation performed on the operation panel 5. The control unit 2 controls the multifunctional machine 100 such that the multifunctional machine 100 is operated according to the setting.

The multifunctional machine 100 includes a print unit 6. The print unit 6 includes a paper feed unit 6a, a transport unit 6b, an image formation unit 6c, an intermediate transfer unit 6d and a fixing unit 6e. The control unit 2 makes the paper feed unit 6a supply sheets one by one when a print job is performed. The control unit 2 makes the transport unit 6b transport the sheet. The sheet is transported through the image formation unit 6c and the fixing unit 6e to the outside of the machine (ejection tray). The control unit 2 makes the image formation unit 6c form a toner image which is placed on the transport sheet. The control unit 2 makes the intermediate transfer unit 6d perform the primary transfer of the toner image formed in the image formation unit 6c to an intermediate transfer belt. The control unit 2 makes the intermediate transfer unit 6d perform the secondary transfer of the toner image on the intermediate transfer belt to the sheet. The control unit 2 makes the fixing unit 6e heat and pressurize the sheet. In this way, the toner image is fixed to the sheet. The printed sheet is ejected by the transport unit 6b to the ejection tray.

The multifunctional machine 100 includes a communication unit 25. The communication unit 25 communicates with a computer 200 such as a PC or a server. The communication unit 25 receives job data from the computer 200. The job data includes data such as image data which indicates the details of printing. The job data includes data which indicates settings on printing. The control unit 2 makes the print unit 6 perform the printing based on the job data.

(Reading of Reference Original Document 7)

An example of the flow of the reading of a reference original document 7 in the information extraction device 1 according to the embodiment will then be described with reference to FIGS. 2 to 4. A user performs, on the operation panel 5, an operation for setting a mode in which information is extracted from the original document. In this way, the multifunctional machine 100 enters an information extraction mode. In the information extraction mode, the storage unit 3, the image reading device 4, the control unit 2 and the operation panel 5 function as the information extraction device 1. In other words, the multifunctional machine 100 includes the information extraction device 1.

In the information extraction mode, the extraction of information is performed. Before the original document from which information is extracted is read, one reference original document 7 is read. The reference original document 7 is an original document for the format of the document from which information is extracted. The reference original document 7 is also an original document which is colored by the user. After the reading of the reference original document 7, processing for reading the original document from which information is extracted is performed. Then, processing for extracting information from image data obtained by the reading is performed (the details of the extraction of information will be described later).

The reading of the reference original document 7 will be described with reference to the flowchart of FIG. 2. The start of FIG. 2 is the time when an operation utilizing the information extraction mode is performed on the operation panel 5. When the information extraction mode is started, the reference original document 7 is set by the user to the original document transport unit 4a or the image reading unit 4b (step #11).

Figure 3A:
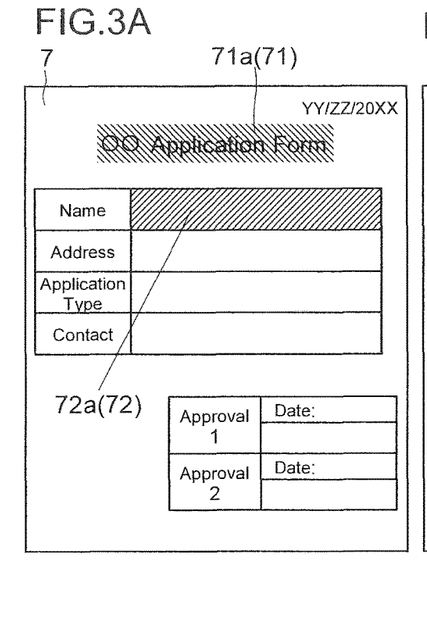
FIGS. 3A and 3B are diagrams showing an example of the reference original document according to the embodiment.
Figure 3B:
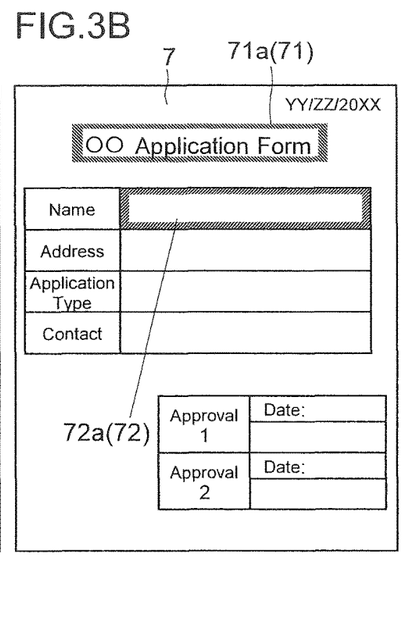

FIGS. 3A and 3B show an example of the reference original document 7. FIGS. 3A and 3B show an example of a certain application form. The reference original document 7 is an original document which is selected from among original documents which have the format of the document from which information is extracted. The reference original document 7 has the same format as the document from which information is extracted. In the reference original document 7, entry columns for information may be in an empty state (blank sheet). Only one reference original document 7 may be provided.

The user colors a feature point (feature portion 71) of the format with a marker of a chromatic color. Examples of the feature point include frame borders, a title and a style number. Furthermore, the user colors an information portion 72 with a marker of a chromatic color which is different from the color of the feature portion 71. The information portion 72 is a portion in which information desired to be extracted within the format is written. For example, the marker is a highlighter. It is possible to utilize a marker that is so dark as to prevent a problem in which it is impossible to identify the character, the pictorial figure and the symbol of the feature portion 71. For example, the feature portion 71 is colored with a green highlighter, and the information portion 72 is colored with a blue highlighter.

FIGS. 3A and 3B show an example where the title portion of "OO Application Form" is colored as the feature portion 71. FIGS. 3A and 3B also show an example where a name column is colored as the information portion 72.

As shown in FIG. 3A, the region of the feature portion 71 may be filled in with the color. In this case, the user fills in the region with the marker of a color which is selected as the color of the feature portion 71. The region of the information portion 72 may also be filled in with the color. The user fills in the region with the marker of a color which is selected as the color of the information portion 72.

As shown in FIG. 3B, the region of the feature portion 71 may be surrounded with lines. The user surrounds the region with the marker of a color which is selected as the color of the feature portion 71. The region of the information portion 72 may also be surrounded with lines. In this case, the user surrounds the region with the marker of the color which is selected as the color of the information portion 72. In other words, the user traces, with the marker, the frame borders of the feature portion 71 or the information portion 72 or the periphery of the character, the pictorial figure or the symbol thereof. As described above, the region may not be filled in with the color.

The control unit 2 makes the image reading device 4 read the reference original document 7 which is set (step #12). Then, the control unit 2 stores, in the storage unit 3, the image data (reference image data D1) obtained by the reading of the reference original document 7 (step #13). The control unit 2 stores the image data obtained by the reading of the reference original document 7 based on color.

The control unit 2 (the image processing unit 22) recognizes the region which is colored (the colored region, the region of a chromatic color) in the reference image data D1 (step #14). Based on the color of the colored region, the control unit 2 classifies the colored region into a first colored region 71a and a second colored region 72a (step #15). The first colored region 71a includes the feature portion 71. The second colored region 72a includes the information portion 72. In the example of FIGS. 3A and 3B, the control unit 2 classifies the colored region as the first colored region 71a such that the characters of "OO Application Form" are included. The control unit 2 also classifies the region of the name entry column as the second colored region 72a.

The control unit 2 (the image processing unit 22) checks the pixel values of individual pixels within the reference image data D1. The control unit 2 recognizes, as the first colored region 71a, the region which is coated with (covered with) the pixels of a pixel value corresponding to the color selected as the color of the feature portion 71. The control unit 2 also recognizes, as the first colored region 71a, the region (the region within a contour) which is surrounded with the lines of the color of the pixel value corresponding to the color selected as the color of the feature portion 71.

The control unit 2 (the image processing unit 22) also recognizes, as the second colored region 72a, the region which is coated with (covered with) the pixels of a pixel value corresponding to the color selected as the color of the information portion 72. The control unit 2 also recognizes, as the second colored region 72a, the region (the region within a contour) which is surrounded with the lines of the color of the pixel value corresponding to the color selected as the color of the information portion 72.

Figure 4:
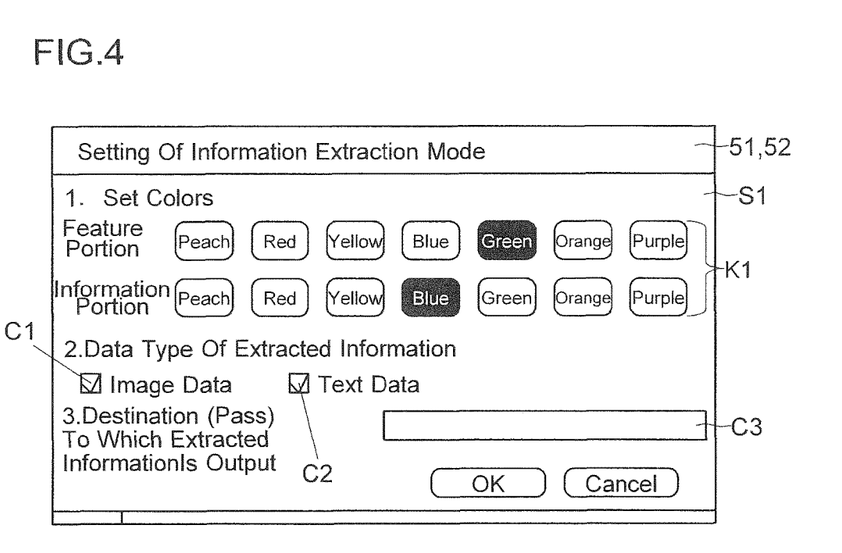
FIG. 4 is a diagram showing an example of an information extraction mode setting screen according to the embodiment.

As shown in FIG. 4, it is possible to set the color for coloring the feature portion 71 (the color for classification as the first colored region 71a). It is also possible to set the color for coloring the information portion 72 (the color for classification as the second colored region 72a). FIG. 4 shows an example of an information extraction mode setting screen S1. When a predetermined operation is performed on the screen of the operation panel 5, the control unit 2 displays the information extraction mode setting screen S1 on the display panel 51. In the information extraction mode setting screen S1, a plurality of color selection keys K1 are provided. Based on an operation on the color selection keys K1, the control unit 2 recognizes the colors for coloring the feature portion 71 and the information portion 72.

The color selection keys K1 of peach, red, yellow, blue, green, orange, purple and the like are provided. For each of the colors (for each of the color selection keys K1), a combination between the color and a pixel value (color component) to be used is previously determined. Data which defines the combinations is stored in the storage unit 3. A case of a 24-bit RGB form is used as an example. For example, combinations between green colors such as R:G:B=103:228:126 (light green), 11:218:81 (malachite green) and 127:246:85 (light yellowish green) and values to be used are previously determined.

The control unit 2 determines, based on the first colored region 71a, in the reference image data D1, the feature image data D2 and a portion to be used (step #16). Then, the control unit 2 stores the feature image data D2 in the storage unit 3 (step #17).

The control unit 2 may store the first colored region 71a itself as the feature image data D2 in the storage unit 3. The first colored region 71a may be included within a frame. Hence, the control unit 2 may store the entire region within the frame including the first colored region 71a as the feature image data D2. For example, the control unit 2 (the image processing unit 22) recognizes, in the reference image data D1, as a ruled line, a straight line in which pixel values that are equal to or darker than a predetermined value are continuous beyond a predetermined length. The control unit 2 recognizes, as the frame, a region which is closed by a plurality of (four) ruled lines.

The coloring is performed with the marker. Hence, the pixel values of individual pixels in the feature image data D2 include color components which are not included in a reference original document that is not colored (original document of the same format which is not colored). In other words, one of the pixels in the feature image data D2 includes the color component of the marker. Hence, the control unit 2 may adjust the colors of the feature image data D2. When the adjustment is performed, the control unit 2 removes color components which are added for coloring markers. For example, the image processing unit 22 of the control unit 2 corrects the colors of the pixels in the feature image data D2. The details of processing for correcting the colors are preferably determined for each color which is used for specifying the feature portion 71. For example, data on how much the density of each color is reduced is determined.

The control unit 2 stores, based on the position of the second colored region 72a, position data D3 in the storage unit 3 (step #18). The position data D3 indicates a distance and a direction from the feature image data D2 to the second colored region 72a. In the subsequent processing, the reference image data D1 is not used. Hence, the control unit 2 makes the storage unit 3 delete the reference image data D1 (step #19). The processing on the reading of the reference original document 7 is completed (end).

The control unit 2 sets a pixel in a specific position of the feature image data D2 to a first reference pixel. The control unit 2 sets a pixel in a specific position of the second colored region 72a to a second reference pixel. The control unit 2 stores, as the position data D3, data indicating a distance and a direction from the first reference pixel to the second reference pixel. The specific position can be determined as necessary. The specific position may be the center of the feature image data D2 or the second colored region 72a. The specific position may be an upper right corner, a lower right corner, an upper left corner or a lower left corner. The control unit 2 may store, as the position data D3, a relative difference between the positions (coordinates) of the feature image data D2 and the second colored region 72a. For example, the control unit 2 stores, as the position data D3, data on how many pixels the second reference pixel is displaced with respect to the first reference pixel in an upward (or a downward) direction and how many pixels the second reference pixel is displaced with respect to the first reference pixel in a leftward (or a rightward) direction.

(Reading of Comparative Original Document and Information Extraction)

An example of the flow of the reading of a comparative original document in the information extraction device 1 according to the embodiment will then be described with reference to FIG. 5.

The reading of the comparative original document and the extraction of information from image data obtained by the reading of the comparative original document will be described below. The comparative original document is set on the image reading device 4 (the original document transport unit 4a). The user may set, as the reference original documents, a bundle of only documents having the same format as the reference original document 7. An original document having a format different from the reference original document 7 may be included in the bundle of the comparative original documents. For example, all documents are removed from a document file which includes a plurality of types of documents. All the documents removed may be set on the original document transport unit 4a as they are. With reference to the flowchart of FIG. 5, an example where a bundle of a plurality of original documents is set on the original document transport unit 4a and where data is extracted will be described.

Figure 2:
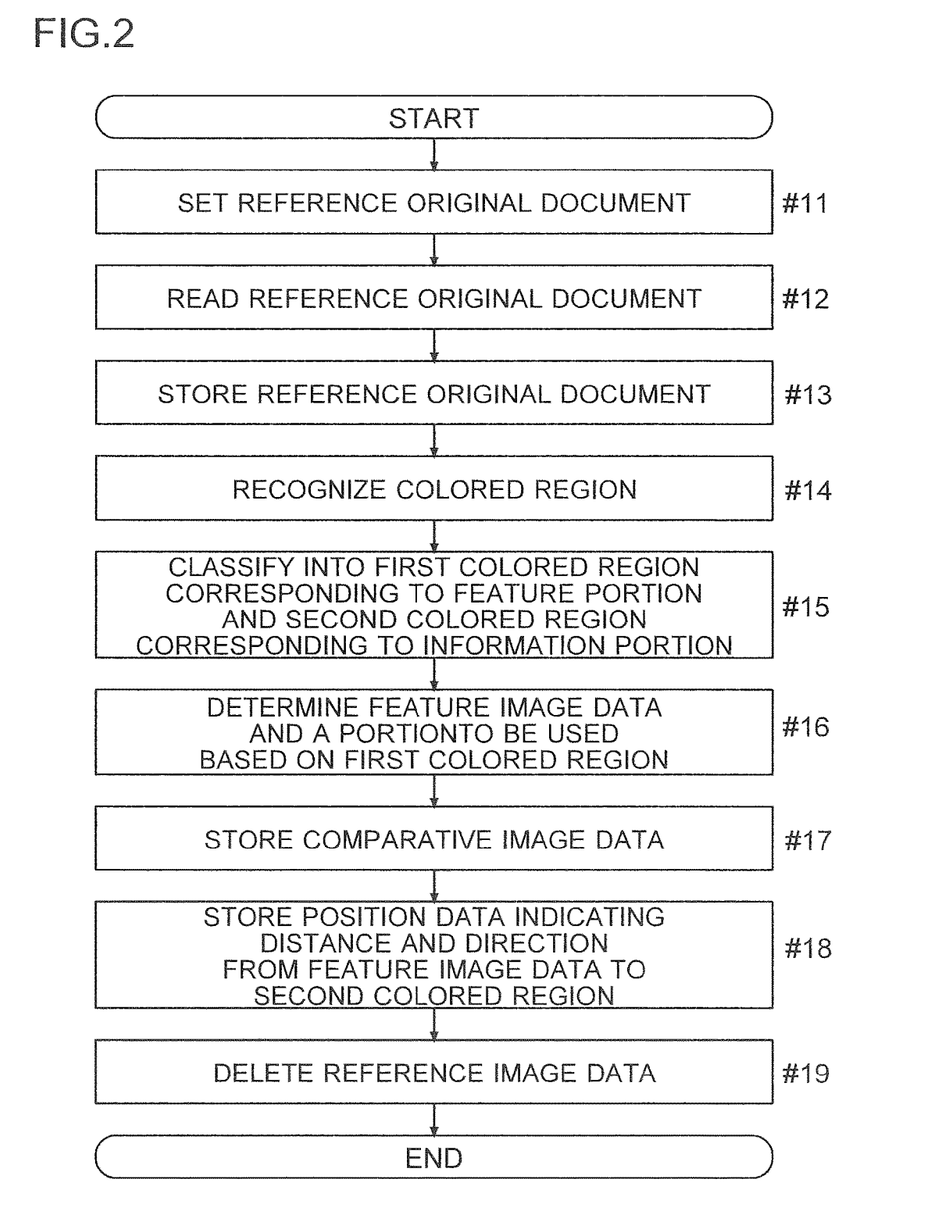
FIG. 2 is a flowchart showing an example of the flow of the reading of a reference original document in an information extraction device according to the embodiment.
Figure 5:
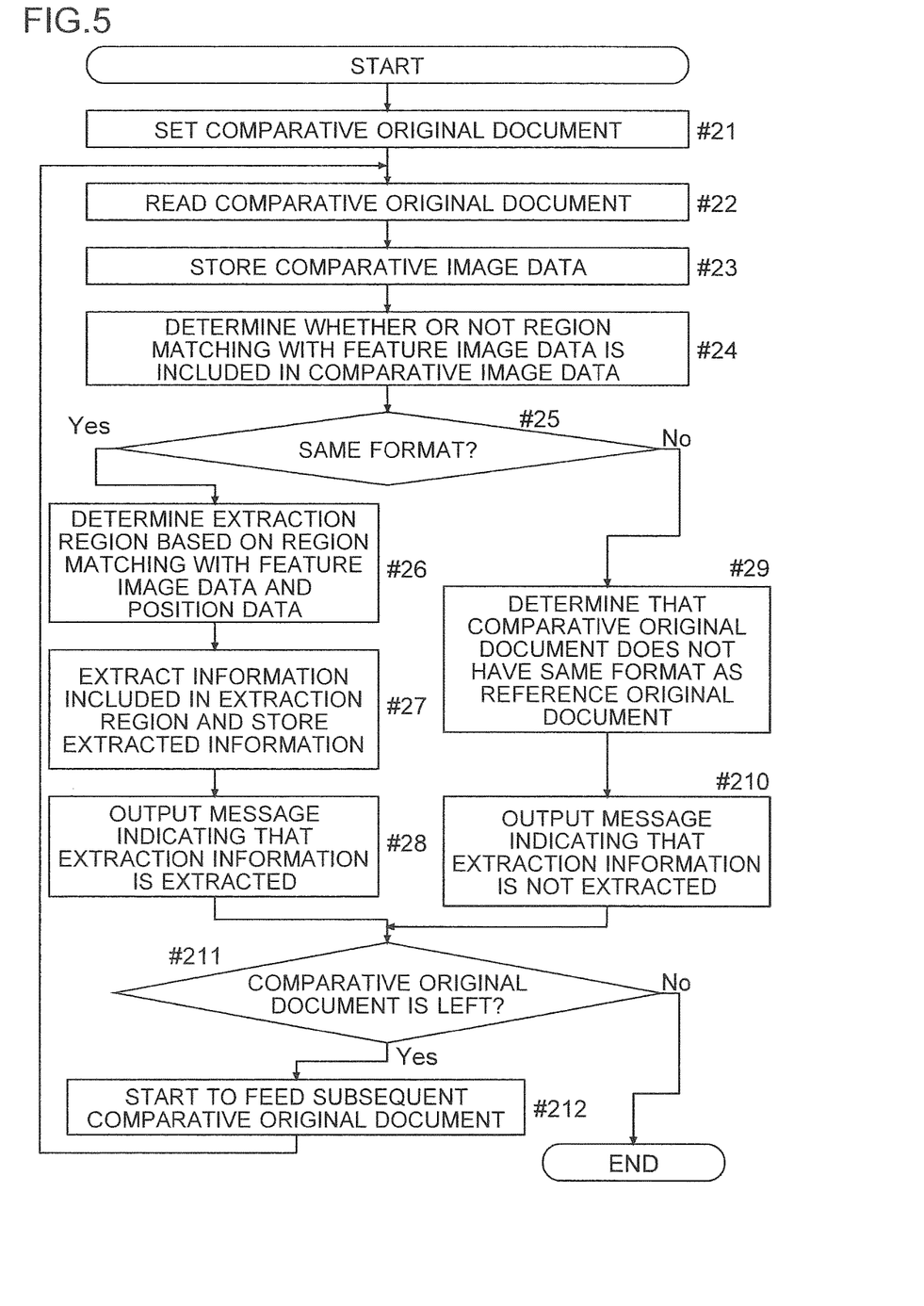
FIG. 5 is a flowchart showing an example of the flow of the reading of a comparative original document in the information extraction device according to the embodiment.

The start of FIG. 5 is a time after the completion of the flowchart of FIG. 2 (at the time of the completion of the reading of the reference original document 7). When the reading of the reference original document 7 is completed, the comparative original document is set by the user on the original document transport unit 4a (step #21). In the stage of step #11 in FIG. 2, a bundle of original documents in which the reference original document 7 is set as the first sheet and in which the sheets subsequent to the second sheet are the comparative original documents may be set on the original document transport unit 4a.

The original document transport unit 4a includes an original document tray (unillustrated). On the original document tray, original documents are placed. In the original document transport unit 4a, an original document set sensor 41 (see FIG. 1) is provided. The original document set sensor 41 is, for example, an optical sensor. The level of the output value of the original document set sensor 41 differs depending on whether or not the original document is set. Based on the output of the original document set sensor 41, the control unit 2 recognizes whether or not the original document is set on the original document transport unit 4a (the original document tray).

The control unit 2 makes the original document transport unit 4a transport one of the comparative original documents which are set. Then, the control unit 2 makes the image reading unit 4b read the transported comparative original document (step #22). The original document transport unit 4a ejects the read comparative original document to the ejection tray (unillustrated). The control unit 2 stores, in the storage unit 3, the image data (comparative image data D4) obtained by the reading of the comparative original document (step #23).

The control unit 2 (the matching processing unit 23) determines whether or not the comparative image data D4 includes a region which matches with the feature image data D2 (step #24). For example, the matching processing unit 23 may perform template matching in which the feature image data D2 is used as a template. When the template matching is performed, the matching processing unit 23 uses the feature image data D2 as the template. The matching processing unit 23 moves the template on the comparative image data D4. Each time the movement is performed, the matching processing unit 23 compares the pixel of the comparative image data D4 and the pixel of the feature image data D2. The matching processing unit 23 determines the position in which the degree of similarity is maximized. When the maximum degree of similarity is equal to or more than a predetermined value, the matching processing unit 23 determines that the region matching with the feature image data D2 is included in the comparative image data D4. When the maximum degree of similarity is less than the predetermined value, the matching processing unit 23 determines that the region matching with the feature image data D2 is not included in the comparative image data D4. The matching processing unit 23 may detect, from each of the feature image data D2 and the comparative image data D4, the feature point which agrees with a previously determined condition. Then, the matching processing unit 23 may perform matching based on the arrangement of the feature point.

In the determination of the matching, the OCR processing unit 24 may be used. In this case, the OCR processing unit 24 converts information (characters and numbers) on the comparative image data D4 and the feature image data D2 into text data. The control unit 2 (the matching processing unit 23) determines whether or not the same text string as a text string extracted from the feature image data D2 is included in text extracted from the comparative image data D4. When the text string is included in the text, the control unit 2 determines that the region matching with the feature image data D2 is included in the comparative image data D4. When the text string is not included in the text, the control unit 2 determines that the region matching with the feature image data D2 is not included in the comparative image data D4.

Based on the result of the determination, the control unit 2 checks whether or not the comparative original document and the reference original document 7 are the documents which have the same format (step #25). When the region matching with the feature image data D2 is included in the comparative image data D4 (yes in step #25), the control unit 2 determines that they are the documents which have the same format. When the region matching with the feature image data D2 is not included in the comparative image data D4 (no in step #25), the control unit 2 determines that they are the documents which have different formats.

When the comparative original document and the reference original document 7 have the same format (yes in step #25), the control unit 2 determines an extraction region (step #26). Based on the region matching with the feature image data D2 in the comparative image data D4 (the region which most matches therewith) and the position data D3, the control unit 2 determines the extraction region.

For example, the control unit 2 determines that a pixel in the specific position of the region matching therewith is a third reference pixel. The control unit 2 also determines that a pixel in the position to which the position is moved from the third reference pixel the distance in the direction indicated by the position data D3 is a pixel (fourth reference pixel) in the specific position of the extraction region. The control unit 2 makes a position relationship between the third reference pixel and the fourth reference pixel the same as a position relationship between the first reference pixel and the second reference pixel.

The control unit 2 determines the extraction region such that the fourth reference pixel is the pixel in the specific position of the extraction region. The control unit 2 may determine the extraction region such that the extraction region has the same area (size) as the second colored region 72a. When the fourth reference pixel is a pixel within the frame, the control unit 2 may determine that all the regions within the frame including the fourth reference pixel are the extraction region. In this case, the extraction region may be larger than the second colored region 72a.

The control unit 2 extracts information included in the extraction region, and stores the extraction information D5 in the storage unit 3 (step #27). The control unit 2 may store, in the storage unit 3, the image data in the extraction region as the extraction information D5. The control unit 2 may make the OCR processing unit 24 perform the OCR processing on the image data in the extraction region. The control unit 2 may store, in the storage unit 3, the obtained text data as the extraction information D5. The control unit 2 may store both the image data and the text data in the storage unit 3. As shown in FIG. 4, in the information extraction mode setting screen S1, check boxes C1 and C2 are provided. The operation panel 5 receives the setting of the type of data which is stored as the extraction information D5. The control unit 2 stores, as the extraction information D5, in the storage unit 3, the data on the type which is set.

In the comparative original document, information in a desired region (printed information, handwritten information) can be automatically converted into data. The control unit 2 makes the display panel 51 display and output a message indicating that the extraction information D5 is extracted (step #28).

On the other hand, when the region matching with the feature image data D2 is not included in the comparative image data D4 (no in step #25), the control unit 2 determines that the read comparative original document does not have the same format as the reference original document 7 (step #29). The control unit 2 makes the display panel 51 display and output a message indicating that the extraction information D5 is not extracted (step #210).

After step #28 and step #210, based on the output of the original document set sensor 41, the control unit 2 checks whether the comparative original document to be read is left (step #211). When the comparative original document is not left (no in step #211), the present flow is completed (end). As with the reference original document 7, the control unit 2 may make the storage unit 3 delete all the comparative image data D4.

On the other hand, when the comparative original document is left (yes in step #211), the control unit 2 makes the original document transport unit 4a start to feed the subsequent comparative original document (step #212). Then, the flow is returned to step #22.

(Output of Extraction Information D5)

The output of the extraction information D5 extracted from the comparative original document will then be described with reference to FIG. 1. In the information extraction device 1 (the multifunctional machine 100), the extraction information D5 converted into data can be printed and output. The operation panel 5 receives the operation of an instruction to print and output the extraction information D5. When the operation of the instruction is performed, the control unit 2 makes the print unit 6 print the extraction information D5 converted into data.

In the information extraction device 1 (the multifunctional machine 100), the extraction information D5 converted into data can be transmitted and output to the computer 200 through the communication unit 25. The operation panel 5 receives a transmission instruction to transmit and output the extraction information D5. When the transmission instruction is provided, the control unit 2 makes the communication unit 25 transmit the extraction information D5 converted into data toward the specified computer 200. When the extraction information D5 is converted into text data, the type of extraction information D5 to be transmitted is set to a type of data which is easily used for data editing (for example, a CSV file). As shown in FIG. 4, in the information extraction mode setting screen S1, a destination setting column C3 may be provided. A configuration may be adopted in which the computer 200 that is the destination can be previously set.

As described above, the information extraction device 1 according to the embodiment includes the storage unit 3, the image reading device 4 and the control unit 2. The storage unit 3 stores data. The image reading device 4 reads an original document so as to generate image data on the original document. The control unit recognizes a colored region that is colored in the reference image data D1 obtained by reading the reference original document 7 with the image reading device 4, classifies, based on the color of the colored region, the colored region into the first colored region 71a and the second colored region 72a, stores, from the reference image data D1, in the storage unit 3, the feature image data D2 that includes the first colored region 71a, stores, in the storage unit 3, the position data D3 indicating a distance and a direction from the feature image data D2 to the second colored region 72a, determines whether or not a region matching with the feature image data D2 is included within the comparative image data D4 obtained by reading the comparative original document with the image reading device 4 after the reading of the reference original document 7, determines, when the region matching therewith is determined to be included therewithin, the extraction region based on the position of the region matching with the feature image data D2 within the comparative image data D4 and the distance and the direction based on the position data D3, extracts information included in the extraction region as the extraction information D5 and stores the extraction information D5 in the storage unit 3 and neither determines, when the region matching therewith is determined not to be included therewithin, the extraction region nor extracts the extraction information D5.

In this way, it is possible to specify the feature portion (the feature image data D2) only by applying the color to the reference original document 7 with the marker (writing utensils such as a highlighter). The feature portion is a portion for identifying the format (form) of the document. The color is only applied to the reference original document 7 with the marker, and thus it is possible to specify the region from which information is extracted. Hence, even when documents having a plurality of formats are present in the bundle of the comparative original documents so as to be mixed, it is possible to extract desired information from only the original documents having the same format as the reference original document 7. In other words, it is possible to extract information in the colored place of the color corresponding to the second colored region 72a. It is not necessary to use a PC for specifying the format from which information is extracted and specifying the region from which information is extracted. The color is only applied to the reference original document 7 with the marker, and thus it is possible to easily specify the format and the information extraction region.

A document (file) may be produced by using spreadsheet software as word processing software. A document in which visual beauty (appearance) is prioritized may be produced by using spreadsheet software. For example, cells are used like the squares of graph paper. The combination of the cells is put to full use. Even when the document is produced with spreadsheet software, in the document in which the appearance is prioritized, the reusability of data is extremely low. For example, when the document is converted into a CSV file, the combination of the cells and ruled lines are removed, and thus it is impossible to interpret the meanings thereof. However, in the present disclosure, desired information can be extracted from the document of a specific format. It is not necessary to analyze and process the file of the document which is produced with spreadsheet software and in which the appearance is prioritized.

The information extraction device 1 includes a message output portion (the display panel 51) which outputs, after the reading of the reference original document 7, each time the comparative original document is read, a message indicating whether or not the extraction information D5 is extracted. In this way, it is possible to indicate, to the user, the document from which the information is extracted and the document from which the information is not extracted among the original documents that are read with the image reading device 4. The user can recognize a failure to extract the information in the document having the same format as the reference original document 7. The user can also recognize that the information is erroneously extracted from the document having the format different from the reference original document 7.

The control unit 2 stores, in the storage unit 3, as the extraction information D5, one or both of image data in the extraction region and text data obtained by performing the OCR processing on the image data in the extraction region. In this way, the information written in the desired region within the comparative original document can be extracted as the image data or the text data.

The control unit 2 determines, as the extraction region, a region which has the same size as the second colored region 72a or is larger than the second colored region 72a. In this way, it is possible to accurately extract the desired information from the comparative original document. The control unit 2 determines the range of the feature image data D2 and the extraction region with reference to the frame. In this way, it is possible to extract the information within the frame without fail.

The operation panel 5 receives the settings of a color for classification as the first colored region 71a and a color for classification as the second colored region 72a. The control unit 2 classifies, based on the colors set on the operation panel 5, the first colored region 71a and the second colored region 72a. In this way, it is possible to set the color which is used for specifying the feature image data D2. It is also possible to set the specified colors for the regions from which the information is extracted. Hence, the user can extract the information from the document with the marker of the desired color.

The control unit sets a pixel in the specific position of the feature image data D2 (the first colored region 71a) to the first reference pixel. The control unit 2 sets a pixel in the specific position of the second colored region 72a to the second reference pixel. The control unit 2 stores, as the position data D3, data indicating a distance and a direction from the first reference pixel to the second reference pixel. In this way, it is possible to store the position data D3 based on a given reference. It is possible to store the correct data indicating the distance and the direction from the feature image data D2 to the second colored region 72a.

The multifunctional machine 100 includes the operation panel 5 which receives the setting of the type of data which is stored as the extraction information D5. The control unit 2 stores the data of the set type as the extraction information D5 in the storage unit 3. In this way, it is possible to store the extraction information D5 of the desired type in the storage unit 3.

The image forming apparatus includes the information extraction device 1. Even when a plurality of types of documents are included in the bundle of the documents so as to be mixed, it is possible to provide the image forming apparatus which extracts the desired information.

Although the embodiment of the present disclosure is described above, the scope of the present disclosure is not limited to the embodiment, and various modifications are added such that the present disclosure can be practiced without departing from the spirit of the disclosure.

What is claimed is:
1. An information extraction device comprising:
   a storage unit which includes a ROM, and ROM and an HDD and stores data;
   an image reading device which includes an image sensor and a lamp and which reads an original document to generate image data on the original document; and a control unit which includes a processor and which recognizes a colored region that is colored in reference image data obtained by reading a reference original document with the image reading device, which classifies, based on a color of the colored region, the colored region into a first colored region and a second colored region, which stores, from the reference image data, in the storage unit, feature image data that includes the first colored region, which stores, in the storage unit, position data indicating a distance and a direction from the feature image data to the second colored region, which determines whether or not a region matching with the feature image data is included within comparative image data obtained by reading a comparative original document with the image reading device after the reading of the reference original document, which determines, when the region matching therewith is determined to be included therewithin, an extraction region based on a position of the region matching with the feature image data within the comparative image data and the distance and the direction based on the position data, extracts information included in the extraction region as extraction information and stores the extraction information in the storage unit and which neither determines, when the region matching therewith is determined not to be included therewithin, the extraction region nor extracts the extraction information.

2. The information extraction device according to claim 1, further comprising:

a display panel which displays, after the reading of the reference original document, each time the comparative original document is read, a message to indicate whether or not the extraction information is extracted.

3. The information extraction device according to claim 1, wherein the control unit stores, in the storage unit, as the extraction information, one or both of image data in the extraction region and text data obtained by performing OCR processing on the image data in the extraction region.

4. The information extraction device according to claim 3, further comprising:

an operation panel which receives a setting of a type of data which is stored as the extraction information, wherein the control unit stores the data of the set type as the extraction information in the storage unit.

5. The information extraction device according to claim 1, wherein the control unit determines, as the extraction region, a region which has a same size as the second colored region or is larger than the second colored region.

6. The information extraction device according to claim 1, wherein the control unit determines a range of the feature image data and the extraction region with reference to a frame.

7. The information extraction device according to claim 1, further comprising:

an operation panel which receives settings of a color for classification as the first colored region and a color for classification as the second colored region, wherein the control unit classifies, based on the colors set on the operation panel, the first colored region and the second colored region.

8. The information extraction device according to claim 1, wherein the control unit stores, as the position data, data indicating a distance and a direction from a first reference pixel to a second reference pixel, the first reference pixel is a pixel in a specific position of the feature image data, the second reference pixel is a pixel in the specific position of the second colored region.

9. An image forming apparatus comprising the information extraction device according to claim 1.

10. A method of controlling an information extraction device, the method comprising: storing data;

reading an original document so as to generate image data on the original document;

recognizing a colored region that is colored in reference image data obtained by reading a reference original document;

classifying, based on a color of the colored region, the colored region into a first colored region and a second colored region;

storing, from the reference image data, feature image data that includes the first colored region;

storing position data indicating a distance and a direction from the feature image data to the second colored region;

determining whether or not a region matching with the feature image data is included within comparative image data obtained by reading a comparative original document after the reading of the reference original document;

determining, when the region matching therewith is determined to be included therewithin, an extraction region based on a position of the region matching with the feature image data within the comparative image data and the distance and the direction based on the position data;

extracting information included in the extraction region as extraction information;

storing the extraction information; and neither determining, when the region matching therewith is determined not to be included therewithin, the extraction region nor extracting the extraction information.

* * * * *